United States Patent [19]

Lungu

[11] Patent Number: 4,564,046
[45] Date of Patent: Jan. 14, 1986

[54] SOLENOID VALVE

[75] Inventor: Corneliu Lungu, Bühlertal, Fed. Rep. of Germany

[73] Assignee: Robert Bosch GmbH, Stuttgart, Fed. Rep. of Germany

[21] Appl. No.: 513,988

[22] Filed: Jul. 14, 1983

Related U.S. Application Data

[63] Continuation-in-part of Ser. No. 432,395, Sep. 30, 1982, Pat. No. 4,524,797.

[30] Foreign Application Priority Data

Feb. 25, 1982 [DE] Fed. Rep. of Germany ....... 3206692

[51] Int. Cl.[4] .............. F16K 31/08; F16K 11/04
[52] U.S. Cl. ................... 137/625.65; 251/65; 251/356; 251/129.21; 251/129.15
[58] Field of Search ............. 251/356, 357, 139, 129, 251/65, 141; 137/329.04, 343, 625.65

[56] References Cited

U.S. PATENT DOCUMENTS

| 1,485,508 | 3/1924 | Kiley | 251/357 |
| 3,368,788 | 2/1968 | Padula | 251/65 |
| 3,379,214 | 4/1968 | Weinberg | 251/65 |
| 3,529,806 | 9/1970 | Kozel | 251/139 |
| 4,005,733 | 2/1977 | Riddel | 251/141 X |
| 4,102,526 | 7/1978 | Hargraves | 251/139 |
| 4,159,026 | 6/1979 | Williamson | 251/139 X |
| 4,211,257 | 7/1980 | Sakakibara et al. | 251/139 X |
| 4,322,057 | 3/1982 | Yamanaka et al. | 251/141 X |
| 4,326,696 | 4/1982 | Ishikawa et al. | 251/141 X |

Primary Examiner—Arnold Rosenthal
Attorney, Agent, or Firm—Michael J. Striker

[57] ABSTRACT

A solenoid valve having an exciter coil is formed with a central passage for guiding an armature of a permanently magnetic material which is polarized in the direction of its axial movement. At the other end of the passage there is provided a tubular core of a magnetically soft material which acts as a mechanical limit stop for the armature and is also shaped as a valve seat controlled by the end face of the armature. An outer magnetically conductive member is arranged at the other end of the coil around the armature and is spaced from the latter by an air gap so as to act as a magnetic holding member for the armature when the coil is energized and the armature is displaced to its working position away from the stop member. Thus at least the end of the armature which faces the valve seat is provided with a frustoconical attachment having on its periphery a plurality of guiding fingers. The tip of the attachment controls the valve seat while the fingers permit the flow of a fluid past the armature.

7 Claims, 12 Drawing Figures

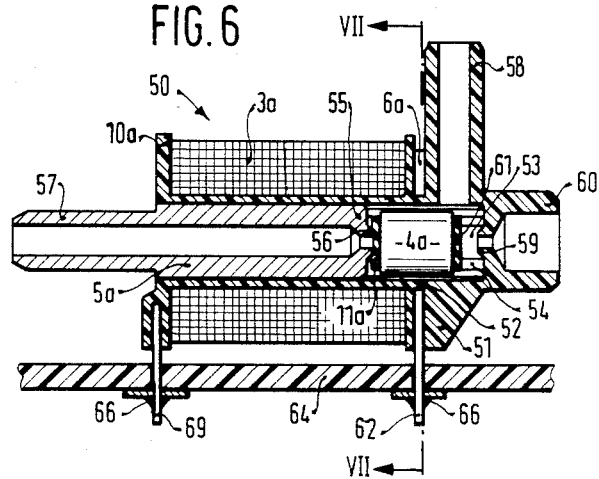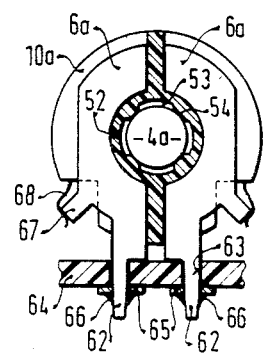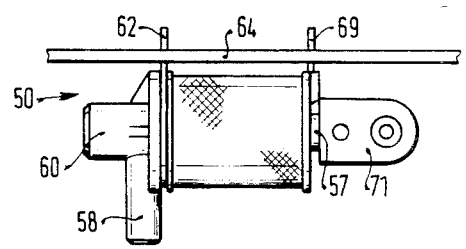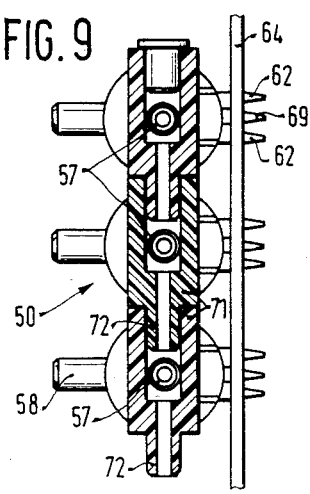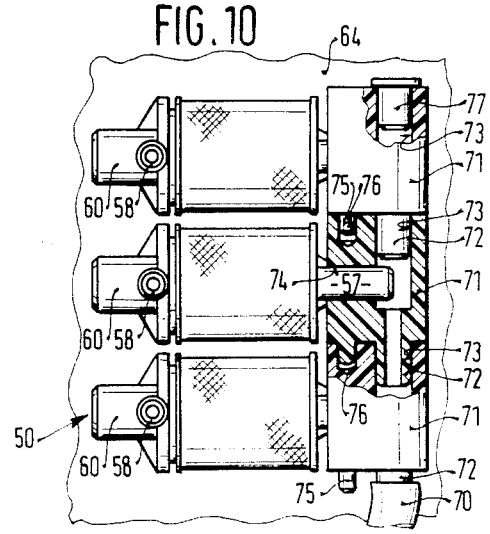

SOLENOID VALVE

CROSS-REFERENCE TO RELATED APPLICATION

This is a continuation-in-part of application Ser. No. 432,395, filed Sept. 30, 1982, now U.S. Pat. No. 4,524,797, dated June 25, 1985.

BACKGROUND OF THE INVENTION

The present invention relates in general to solenoid valves, and in particular to a solenoid valve of the type having a solenoid provided with a plunger in the form of a permanent bar magnet which is coaxially displaceable in an exciter coil and polarized in the direction of its movement.

In the German published patent application No. 1,808,900 an electromagnetic drive suitable for driving a solenoid valve is described. This drive consists of an exciter coil and a longitudinally displaceable plunger which is in the form of a permanent magnet polarized in the direction of its movement. Another solenoid of this type is described in the German Offenlegungsschrift No. 1,489,088 in which the permanent magnet plunger consists of two permanent magnet segments which during the movement in the direction of displacement maintain a distance from each other. The north poles or south poles of these two magnetic segments are directed against each other. In a further operation of this known drive an intermediate piece of ferrite is provided between the two permanent magnetic segments. Even this modification is suitable for driving component parts of valves.

SUMMARY OF THE INVENTION

A general object of the present invention is to provide an improved solenoid valve of the aforedescribed kind.

More particularly, it is an object of the invention to provide a solenoid valve which has a higher efficiency and is more reliable in operation than prior-art valves of this type.

In keeping with these objects and others which will become apparent hereafter, one feature of the invention resides, in a solenoid valve including an exciter coil and an armature in the form of a permanent bar magnet which is coaxially displaceable into and aout of the coil and polarized in the direction of its movement, in the provision of a first core of a soft magnet material projecting into the exciter coil and magnetizable so as to form a limit stop for the armature. Another feature of this invention resides in securing at one end of the coil a magnetic field conducting member surrounding the armature at a spaced relationship therewith and be shorter in axial direction than the armature.

By virtue of this measure, in inactive condition of the exciter coil the permanently magnetic armature and the magnetic field conducting body generate forces which move the armature toward the fixed limit stop of the magnetically soft material which holds the armature in its rest position. Accordingly, conventional return springs which normally counteract the armature in its working direction can be dispensed with and consequently the size of the solenoid can be reduced and at the same time smaller excitation currents are required. The solenoid valve of this invention also eliminates the risks which may occur during the operation due to a rupture or breakage of the return springs. The magnetic field conductor cooperating with the armature results in the reduction of the electromagnetic resistance of the solenoid and magnetic flux is oriented in the most suitable manner so that the exciter coils can be made so compact and consume less energy. The magnetic flux conducting cores which are arranged in the path of movement of the armature as mechanical stops act at the same time as valve seats. In addition, they have the advantage that they exert the stronger holding forces the closer is the armature. The solenoid valves of this invention can be particularly of advantage when installed in control systems for motor vehicles where light weight is required. The reduced size and consumption as well as in increased operational speed of this invention enable the application in new fields where prior-art valves due to their large size and slow operation were impractical.

For example, a permanent magnet armature is utilized as a guide spool of the valve so that multiple function components result in less expensive manufacture and a further saving of weight.

The magnetic field conductors are with advantage designed such that they serve for mounting the solenoid valve on a base plate which can be, for instance, a conductive plate of an electrical switching circuit. Also the terminals of the exciter coil can be connected via the magnetic field conductors to separate electrical connectors.

In a further elaboration of this invention it is possible to combine several solenoid valves on a base plate and readily connect them together. In a preferred embodiment, the solenoid valves are provided with plug and socket type connections arranged in such a manner that a plurality of valves can be readily assembled side-by-side.

In a further embodiment of this invention, the armature is provided at its end faces with annular attachments having along its periphery a plurality of clamping fingers which resiliently engage the rim of the armature. The attachments are of a magnetically conductive material and the fingers serve for guiding the armature in the coil form. The annular attachments hold in position on the end faces of the armature valving elements, such as for example elastic sealing disks. Since the guiding fingers firmly clamp the valving elements to the armature, there is no need for gluing or vulcanizing the valving elements to the end faces, and for this reason saving of installation time and costs results.

According to another feature of this invention, the annular attachment is in the form of a frustoconical ring of a magnetically soft material. By virtue of this configuration, magnetic flux lines and the magnetic flux density produced by the attachment favorably influence the operational condition of the solenoid valve. In accordance with still another feature of this invention, the part of the core which forms the stop for the armature is radially extended into a flange formed with a frustoconical recess matching the attachment on the armature. The actual stop portion, however, slightly projects from the bottom of the frustoconical recess, so that in the stop position of the armature an annular air gap results between the attachment and the flange. In this manner, an advantageous condition for magnetic holding forces are created, and in addition the movement of the armature in response to the actuation of the exciter coil is also improved. The elastic valving element clamped by the annular attachment has also a conical shape formed on its tip with a resilient plug matching the valve seat in the tubular core of soft magnetic material. This arrangement contributes to the improvement of pressure elastic quality of the valving action.

According to still another feature of this invention, an outer magnetically conductive member is provided around the exciter coil, and in the range of the armature is formed with an annular air gap. This outer magnetically conducting member increases the holding and shifting magnetic forces acting on the armature.

The novel features which are considered characteristic for the invention are set forth in particular in the appended claims. The invention itself, however, both as to its construction and its method of operation, together with additional objects and advantages thereof, will be best understood from the following description of specific embodiments when read in conjunction with the accompanying drawing.

BRIEF DESCRIPTION OF THE DRAWING

FIG. 6 is a sectional side view of a complete solenoid valve of this invention;

FIG. 7 is a sectional front view of the valve of FIG. 6, taken along the line VII—VII;

FIGS. 8, 9 and 10 show respectively a plurality of interconnected valves according to FIG. 6 mounted on a common base plate;

DESCRIPTION OF THE PREFERRED EMBODIMENTS

Figure 1:
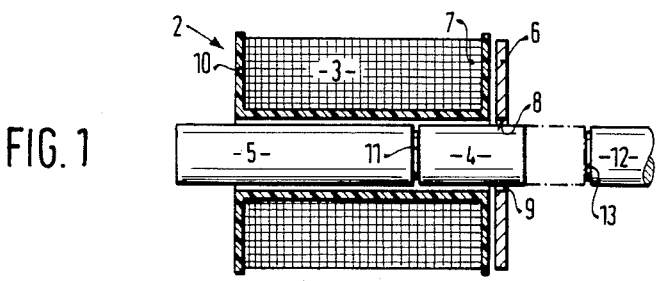
FIG. 1 is a sectional side view of a solenoid in a valve according to this invention.
Figure 2:
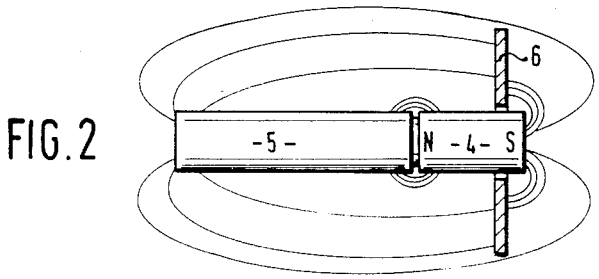
FIG. 2 shows schematically the flux of magnetic lines in the solenoid of FIG. 1.
Figure 3:
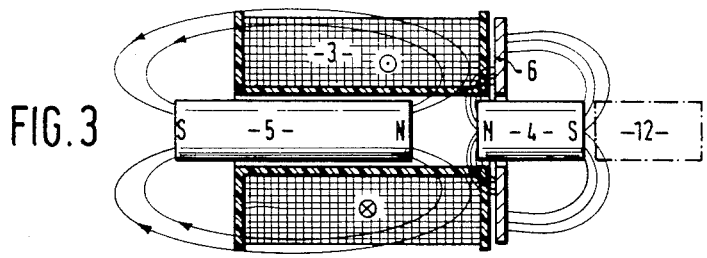
FIG. 3 shows the magnetic flux in another position of the armature in the solenoid of FIG. 1.

Referring firstly to FIGS. 1-3, reference numeral 2 indicates a first embodiment of essential parts of the solenoid valve of this invention. The valve includes an exciter coil 3, a bar-shaped armature 4 plungeable in the center of the coil, an axial magnetic field conducting core 5 projecting at one end in the exciter coil opposite the armature 4, and a radial magnetic field conducting member 6 in the form of a hold plate is fixedly arranged at the end 7 of the exciter coil around the armature 4. The radial magnetic field conductor body 6 has a hole 8 which is larger than the diameter of the armature 4 thus forming therewith an air gap 9. The axial magnetic conducting body 5 is in the form of a tubular core which is rigidly connected to the inner wall of core 10 on which the exciter coil 3 is wound. The bar-shaped armature 4 is of a permanently magnetic material such as ferrite defining a north pole and a south pole oriented in the direction of center axis of the coil 3. Due to the permanent polarization, when the exciter coil is deenergized, armature 4 is attracted to the axial core 5 which thus forms a first axial limit stop. If desired, a spacer disk 11 of a non-magnetizable is provided between the parts 4 and 5 so that attraction forces between the armature and the limit stop do not exceed a predetermined value. As it will be seen from FIG. 2, the radial magnetic field conducting member 6 serves for concentrating magnetic flux lines emanating from the south pole of the armature 4 in the proximity of the latter whereby in the rest position of the armature illustrated in FIG. 2 the magnetic circuit is closed via the induced north pole in the core 5. The north pole of the armature which is remote from the hold plate 6, is spaced a very short distance by a spacer plate 11 from the induced south pole of the core 5 and thus the attraction magnetic forces has the optimum effect for holding the armature in its rest position. At the same time, due to the remoteness of the noth pole from the disk 6, the magnetic lines of force from the south pole of the armature are induced at strongly curved paths into the radial magnetically conductive plate 6.

Upon energization of the exciter coil 3, armature 4 is shifted axially outwardly from the interior of the coil and the north pole of the armature is closer to the axial magnetic conductor 6 than the south pole. Also the soft iron fixed core 5 undergoes a reversal of its polarization and as a result, magnetic lines from the north pole of the armature 4 are bent in the radial magnetic conductor 6 whereas the magnetic lines from the south pole from the armature to the element 6 are stretched radially outwardly as compared to the rest position in FIG. 2. In this manner, upon excitation of coil 3, the single magnetic circuit is split into two closed magnetic circuits of the same polarization, namely the circuit induced in the soft iron core 5 and the circuit induced in the armature 4 and in the radial magnetic conducting plate 6, reinforcing the permanent magnetic circuit of the armature by adding thereto the induced magnetic forces of the plate 6 acting in the same direction as the electromagnetic forces produced by coil 3. It is of advantage when armature 4 is made of ferrite because this material enables to design the armature 4 with reduced mass and length, thus permitting an operation at high accelerations.

In addition to the axial core 5 acting as a first limit stop for the armature, there is also provided a bar-shaped core 12 of a magnetic conducting material located in the path of movement of the armature outside the coil and acting as the second limit stop to define a fixed actuated position of the armature. A spacer disk 13 of a non-magnetic material is also arranged between the armature 4 and a second limit stop 12. The thickness of the spacer plate 13 is adjusted so as to prevent sticking of the armature to the magnetic conducting body 12 and insures that upon reversal of the direction of current flowing through the exciter coil 3 the armature 4 is readily displaceable in opposite direction away from the stop 12.

Figure 4:
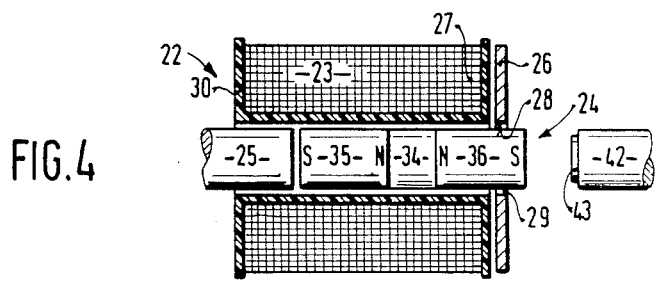
FIG. 4 is a side view of another embodiment of the solenoid of FIG. 1.
Figure 5:
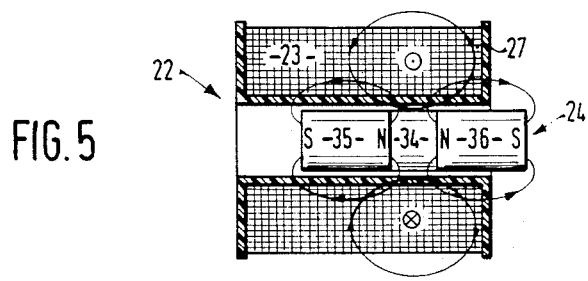
FIG. 5 illustrates the flux of magnetic field lines during energization of the exciter coil.

In the embodiment according to FIGS. 4 and 5 the armature 24 is designed for generating larger driving forces. Exciter coil 23 wound on a supporting form 30, has a central passage for accumulating at one end a fixed core 25 of a soft magnetic material acting as a first limit stop, and a similar second limit stop 42 of magnetically conducting material which is located outside the coil 23 in alignment with the stop 25. An auxiliary magnetically conducting plate 26, similar to plate 6 in the preceding example, surrounds the central passage of coil 23 near its end 27. In this embodiment, armature 24 plungeable into the central passage of coil 23, is assembled of three axial segments, namely of an intermediate segment 34 of a magnetically soft material which at both ends thereof is connected to segments 35 and 36 of a permanently magnetic material. Both end segments 35 and 36 are polarized in the direction of movement of the whole armature 24 whereby the poles of the same polarity are facing the ends of the intermediate soft magnetic segments 34. In this example, the north poles are facing the soft magnetic segments 34 and the south poles are at each end of the armature 24. Upon energization of the exciter coil 23, the induced electromagnetic forces are as it will be seen from direction of magnetic fluxes illustrated in FIG. 5, act against magnetic forces of the innermost permanent magnetic segment 35 thus causing the displacement of the entire armature 24 in the direction toward the right-hand end 27 of the exciter coil. On the other hand, the magnetic flux in the outer permanent magnetic segment 36 is oriented in the same direction as the electromagnetic flux generated by the coil 23 which in the range of the end 27 of the coil intersects the magnetic field of the permanent magnet segments 36. In this manner, higher driving forces are generated in comparison with the example of FIG. 1. During the time period when the exciter coil is deenergized, the axial magnetic conductor 25 which is fixedly mounted at the left-hand part of the coil 23 generates magnetic holding forces for the segment 35. In addition, the annular magnetically conducting body 26 arranged via the end 27 of the coil 23 and separated by an aggregate 29 from the armature 24, generates holding forces for the other segment 36. Upon excitation of the coil 23, the armature 24 abuts on a spacer ring 43 of a non-magnetic material and the outer soft magnetic core 24 generates holding forces for the armature.

If desired, a magnetic short circuit can be provided between the elements 6 and 5 or 26 and 25 around the exciter coil 3 or 23. As known, such a magnetic short circuit reinforces magnetic flux nevertheless has the disadvantage of slowing down the movement of the armature. Accordingly, the magnetic short circuit (not illustrated) is employed only in those cases when larger driving forces are preferred to fast action.

Solenoid valve 50 illustrated in FIG. 6 has an exciter coil 3a wound on a supporting form 10a, an armature 4a of a permanently magnetic material, a first limit stop in the form of a magnetic conducting body 5a fixed in the center passage of the exciter coil, a radial magnetically conducting member 6a surrounding with an air gap the armature 4a at one end of the exciter coil and a spacer disk 11a provided between the magnetic core 5a and the armature 4a.

Valve housing 51 is connected to the coil supporting form 10a by a tubular neck 52 in the range of the radial magnetic conductor 6a. Preferably, the supporting form 10a, neck 52 and the valve housing 51 are made as a single component part, for example by spraying of a thermoplastic material. The valve housing 51 is formed with a valve chamber 63 communicating with the interior of the central passage of the supporting form 10a. The inner wall of the valve chamber 53 is formed with axial guiding ribs 54 for guiding the armature 4a in axial direction. The axial magnetically conducting core 5a is in the form of a tube for conducting a working fluid and receivingly connected to the inner wall of the supporting form 10a. The end 55 of the member 5a which faces the armature 4a is reduced in clearance and serves as a valve seat 56. The valve seat cooperates with a non-magnetic disk 11a which is secured to the inner end of armature 4a and acts as a sealing disk. The outer end 57 of the tubular member 5a projects outwardly from the form 10a and serves as a connection piece of the valve 50. Another connection piece 58 is directed transversely to the center axis of the tubular member 5a and opens in the valve chamber 53. Armature 4a as in the preceding examples is magnetically polarized in the direction of its movement and one of its poles, in this example a south pole is directed against the valve seat 56 which is of a soft magnetic material. Magnetic flux or lines of magnetic force exiting from the north pole of the armature 4a pass through the air gap into the magnetically conducting ring 6a, end part of the coil 3a and the valve seat 56 into the south pole of the armature. Consequently, when the coil 3a is deenergized, holding forces are induced in the magnetically conducting valve seat 56 which hold the armature in its rest position illustrated in FIG. 6. In this rest position, sealing disk 11a is compressed against the valve seat 56 and the passage between the connection pipe 57 and the valve chamber 53 is closed. The disk-shaped radial magnetic conductor 6a, the axial length of which is substantially shorter than that of the armature 4a, acts in the same manner as the member 6 described in connection with FIG. 2.

An additional valve seat 59 is formed in the end wall of valve chamber 53 facing the north pole of the armature 4a. The valve seat 59 communicates with a tubular connection piece 60 which is in alignment with the connection piece 57. The connection piece 60 is integrally formed on the valve housing 51. Another sealing disk 61 of magnetic material is provided on the north pole side of the armature 4a and cooperates with the valve seat 59. When the exciter coil 3a is energized by a current flowing in such a direction at which the induced electromagnetic field acts against the polarization of the armature 4a, then the latter is repelled from the magnetized valve seat 56 and displaced against the opposite valve seat 59. As a result, communication is established between the connection piece 57 and the valve chamber 53 whereas the sealing disk 61 interrupt the communication between the large chamber 53 and the connection piece 60. In this actuated position the armature is spaced apart from the magnetic conductor 5a such a distance that the south pole of the armature 4a is in the range of the radial magnetic conductor 6a and a distribution of magnetic flux lines will arise corresponding to that as illustrated in FIG. 3 and the armature 4a is held in its actuated position. When the direction of excitation current in the coil 3a is reversed, then armature 4a is again returned into its starting position in contact with the valve seat of the magnetic conductor 5a.

As mentioned before, the magnetically conductive radial member 6a is arranged on the neck 52 interconnecting the valve housing 51 and the coil supporting form 10a. In this embodiment, the disk-shaped annular magnetic conductor 6a is divided in two halves separated from each other by the electrically insulating material of the valve housing and each being formed with downwardly projecting stepped lugs 62. The lugs serve for mounting the whole valve 50 on a base plate 64. Upon insertion of the lugs 62 in corresponding mounting holes 63 in the base plate, the projecting portions of the lugs are bent and the valve 50 is thus held in position resting on the steps shown in the upper part of the lugs. The base plate 64 can be a bolt of electrical apparatus provided with conductive webs 65 through which the ends of the lugs 62 are secured by soldering at point 66 for example. Each half of the radial magnetic conductor is further formed with soldering lugs 67 to which the ends of the winding of exciter coil 3a are secured. In this manner, the radial magnetic conductor serves as a mounting member for fastening the valve 50 to the base plate 64 and simultaneously provides electrical terminals for the coil 3a connectable to an external electrical circuit. To stablize the position of the valves against tilting, additional mounting lugs 69 are embedded in the coil form 10a which are again inserted into mounting holes in the base plate and secured to conductor 65 by soldering at point 66. These additional lugs can also serve as terminals for the winding of the coil 3a. In a modification, the one piece armature 4a can be replaced by the divided armature 24 described before.

In the case when it is desired to connect a plurality of solenoid valves 50 to a pressure air supply circuit or the like, it is of advantage when a series of such valves is mounted side-by-side on a single bolt 64. As it will be seen from FIGS. 8–10, the intake connection pipe 57 of each valve 50 is provided with plug-in adapters 71 by means of which the individual valves are connected in series with each other and to a pressure fluid supply conduit 70. Each plug-in coupling 71 has a plug connection 72 and at the opposite side a separate connection 73 fitting into the plug connector of the adjoining valve. Another connecting socket 74 directed transversely to the connection line between plug 73 and socket 72, receives the projecting connection piece 57 of each valve. The individual plug-in couplings 71 are first assembled and then the connection pieces 57 of the valves are inserted into the transverse opening 74. To facilitate the alignment of the plug-in coupling 71 during their installation, there are provided centering pins 75 matching the corresponding centering holes 76 directed parallel to the plugs 72. In this manner, the plug-in adapters 71 can be snapped together in a predetermined position only in which the transverse connection openings 74 are arranged in a common plane. The last coupling socket 73 is closed by means of a stopper 77.

By virtue of the construction according to this invention, the resulting solenoid valve is compact, low weight and inexpensive to manufacture. Its mounting lugs 66 and 69 enable in a very simple manner an automatic connection to an electrical circuit so that the assembly of electrical devices in which the solenoid valves are incorporated is very economical.

Figure 11:
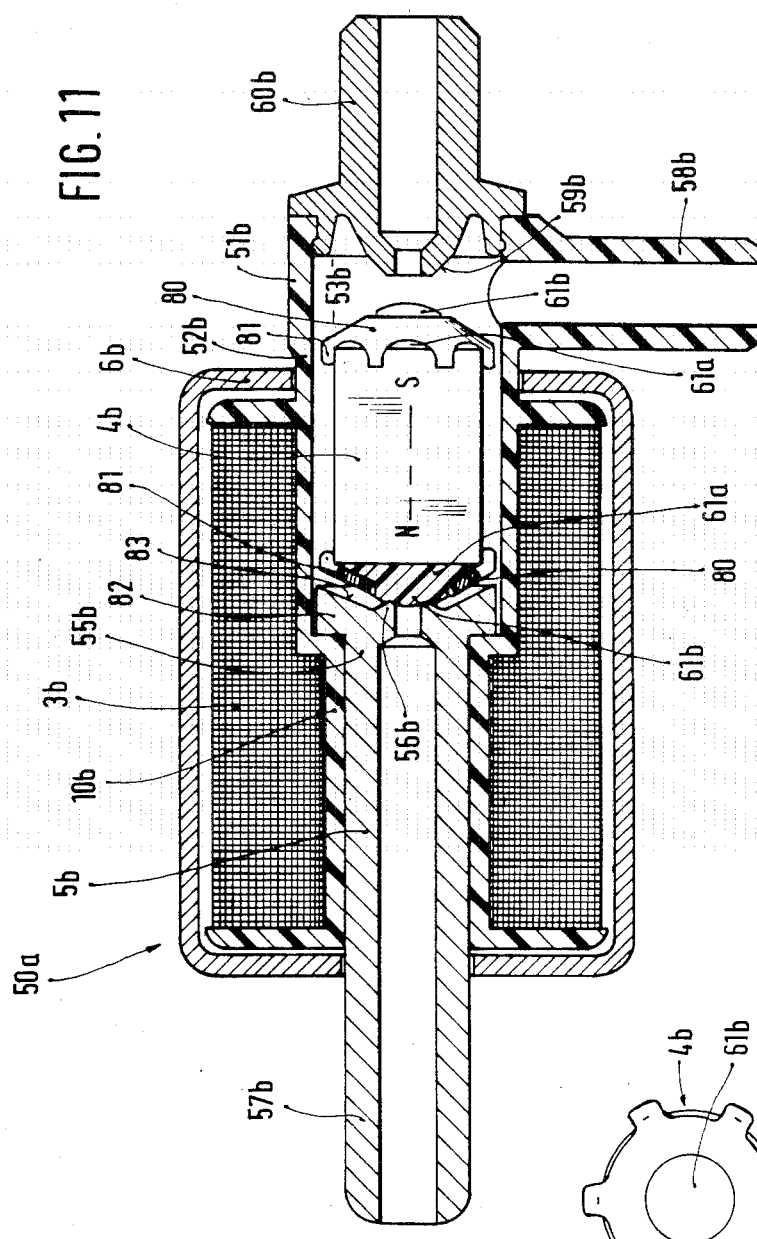
FIG. 11 is a sectional side view of still another embodiment of the solenoid valve of this invention.
Figure 12:
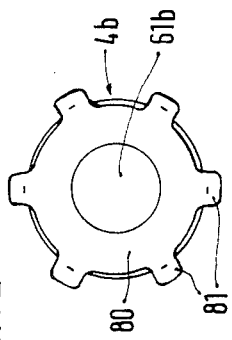
FIG. 12 is a front view of the solenoid valve of FIG. 11.

The embodiment of solenoid valve 50a illustrated in FIGS. 11 and 12 also includes an exciter coil 3b, a permanently magnetic armature 4b, a first magnetic field conducting member 5b in the form of a tubular core, a second magnetic field conducting member 6b in the form of an outer jacket surrounding the exciter coil and including an annular end plate 6b arranged around the armature 46. The end plate 6b is separated from the armature by an air gap and has a thickness which is substantially smaller than the length of the armature. Similarly as in the preceding embodiments, the magnetically conductive jacket together with its end plate 6b serves for concentrating magnetic flux lines emanating from a pole of the permanently magnetic armature 4b. The induced magnetic flux holds the armature in its rest position when the exciter coil is deenergized. A coil form 10b is integrally connected by a tubular neck 52b to valve housing 51b. Preferably, the housing 51b, the neck 52b and the coil form 10b are produced as a single piece, preferably by injection molding of a thermoplastic material. Valve housing 51b encloses a cylindrical chamber 53b which accommodates the armature 4b. Similarly as in the preceding example, armature 4b is in the form of a permanently magnetic cylindrical piece which is polarized in the longitudinal direction of the solenoid valve 50a with its poles N and S adjoining the end faces of the armature. In this embodiment, annular attachments 80 of a magnetically conductive material are formed with peripheral clamping fingers 81 which firmly engage the rim of the assigned end face of the armature. The fingers 81 overlap in radial direction the end faces and serve as guiding elements for the reciprocating movement of the armature 4b in the valve chamber 43b. Due to the spacings between respective fingers, an annular space between the armature and the inner wall of valve housing 51b is created, permitting the flow of a fluid medium through the valve. Preferably, the clamping force of the resilient fingers 81 is dimensioned such as to ensure reliable mount of the ring-shaped attachments to the armature, without the need for gluing or vulcanizing, and the like. The first magnetic field conducting member 5b is in the form of a tubular core inserted in the coil form 10b in such a manner that its end part 55b is located approximately midway between the ends of the exciter coil 3b. This end part 55b has the shape of a valve seat 56b directed against an end face of the armature 4b. The end faces of the armature are provided with valve elements 61a in the form of elastic sealing disks which are held in position in the armature by the conical rings 80. Preferably, the valving elements 61a have also a conical configuration matching the inner surface of the annular rings and being formed at their tips with plug-like projections 61b cooperating with the assigned valve seats 56b. The opposite end 57b of the first magnetic field conducting member extends out of the coil form 10b and serves as a connection piece for the solenoid valve. Another connection piece 58b communicates with the valve chamber 53b near the other end of armature 4b and is directed transversely to the center axis of the member 5b. Due to the aforedescribed polarization of the armature, magnetic field lines emanate from the north pole N of armature 4b via the fingers 81 and the ring-shaped attachement 80 and pass over the annular air gap 83, flange 82, magnetic flux conducting member 5b, via a further air gap in the outer magnetic flux conducting member 6b which preferably surrounds the exciter coil 3b, then over an air gap in the range of tubular neck 52b in the opposite annular attachment 80 and its fingers 81, are returned to the south pole S of the armature 4b. This flux of lines of magnetic force has the effect that, when the exciter coil 3b is deenergized, the armature 4b, in the position illustrated in FIG. 11, is urged by its permanent magnetic force against the first magnetic field conducting member 5b and the sealing valve element 61a with its plug 61b is pressed against the valve seat 66b, thus closing the passage between the connection piece 57b and valve chamber 53b. The outer diameter of flange 82 is approximately as large as is the clearance of the valve chamber 53b. The flange 82 has a conical recessed surface 83 whose contour matches the conical outer surface of the annular attachment 80. The valve seat portion 56b extends above the bottom part of the recess 83, and consequently when the tip plug 61b of valve element 61a engages the valve seat, an annular air gap 83' results between the attachment and the flange 82. As mentioned before, the cooperation of flange 82 with the ring-shaped attachment 80 and with its fingers 81 favorably affects the magnetic flux distribution between the first flux conducting member 5b and the armature 4b and the holding force in the closing position of the valve is enhanced.

Opposite the annular attachment piece 80 at the south pole of the armature 4b, there is provided another valve seat 59b formed in a connection piece 60b secured to the valve housing 51b and communicating with the valve chamber 53b in axial alignment with the armature and the opposite valve seat 56b. When the exciter coil 3b is energized by electric current flowing in a direction in which the induced magnetic field acts against the permanent magnetic polarization of the armature 4b, then the latter is shifted away from the magnetic field conducting member 5b in the direction against the valve seat 59b. The outer magnetic field conducting member 6b is magnetized by the coil 3b so that its south pole is in the range of the air gap around the valve chamber 53b. As a consequence, the south pole of the outer member 6b attracts the north pole N of armature 4b and repels its south pole towards the other valve seat 59b. As a result, a communication is established between the connection piece 57b and the valve chamber 53b, whereas the passage between the valve chamber and the connection piece 60b is closed. As soon as the supply of excitation current to the coil 3b is interrupted or the polarity of the current is reversed, the armature 4b immediately returns to its rest position illustrated in the drawing. The radial cross section of the inner or first magnetic field conducting member 5b is smaller than the clearance of the valve chamber 53b. This reduced cross section of the member 5b has the advantage of improved neutralization of the insulation space and improved distribution of windings of the exciter coil.

The thickness or the axial distance of the central part of valving element 61a from the end faces of the armature is selected such that the plug-shaped tip 61b possesses sufficient elasticity for ensuring a reliable closing of valve seats 56b and 59b. Preferably, the valve element 61a occupy the entire cone-shaped space between the inner wall of annular rings 80 and the end face of the armature. The size of these hollow spaces is predetermined by the desired magnetic quality of the annular attachments 80. This hollow space is sufficient for ensuring a reliable mount of the sealing element 61a and at the same time to provide an advantageous magnetic flux distribution and allow a short axial dimension of the valve chamber 53. The flange 82 serves for reducing the induction through the air gap and has the effect that the characteristic line of attractive or repulsive forces acting on the armature is not too steep. A further advantage of the conical shape of annular attachments 80 and of the valve element 61 is the fact that, in assembly of the solenoid valve, the armature 4b is promptly and reliably centered so that assembly costs are further reduced.

A modification of the aforedescribed embodiment of FIG. 11 can be made by increasing the distance between the valve seats 59b and 66b, so that the resulting solenoid valve has two stable closing positions similarly as the embodiment according to FIG. 6.

It will be understood that each of the elements described above, or two or more together, may also find a useful application in other types of constructions differing from the types described above.

While the invention has been illustrated and described as embodied in specific examples of solenoid valves, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the present invention.

What is claimed as new and desired to be protected by Letters Patent is set forth in the appended claims.

I claim:

1. A solenoid valve, including an exciter coil and an armature in the form of a permanently magnetic bar which is coaxially movable in said coil and polarized in the direction of its axial movement, comprising a first magnetic flux conducting member of a soft magnetic material which is inserted partially into said coil to form a limit stop for a rest position of the armature, a second magnetic flux conducting member of a soft magnetic material adjoining said coil in the range of movement of the armature and being spaced from the armature by an air gap, the cross-section of said second magnetic flux conducting member when viewed in the direction of movement of the armature, being in the range of said air gap shorter than the axial dimension of the armature to close magnetic force lines holding said armature in said rest position when said coil is deenergized; at least one valve seat facing an end face of the armature, an annular magnetically conductive piece having on its periphery a plurality of clamping fingers attached to a peripheral portion of the armature, and a valving element of a non-magnetic material held in position on said end face and projecting through said annular piece to cooperate with said valve seat.

2. A solenoid valve as defined in claim 1, wherein said clamping fingers are resiliently biased so as to firmly snap on the armature.

3. A solenoid valve as defined in claim 2, wherein the annular piece has a frutoconical configuration defining with the end face of the armature a hollow conical space.

4. A solenoid valve as defined in claim 3, wherein the end part of the first magnetic flux conducting member which is arranged in the coil is formed with a flange defining a conical recess matching the conical contour of said annular piece.

5. A solenoid valve as defined in claim 3, wherein said valving element has a conical shape matching the hollow conical space in said annular piece and defining at its tip a plug-shaped projection directed against said valve seat.

6. A solenoid valve as defined in claim 5, wherein said second magnetic flux conducting member is in the form of a tubular jacket enclosing said exciter coil and the projecting end part of said first magnetic flux conducting member.

7. A solenoid valve as defined in claim 6, further comprising an additional valve seat facing the other end face of said armature and said other end face being provided with an additional annular piece with clamping fingers attached to a peripheral portion of said other end face, said additional annuler piece holding in position another valving element of a non-magnetic elastic material cooperating with the additional valve seat.

* * * * *